(12) United States Patent
Lee

(10) Patent No.: US 12,446,179 B2
(45) Date of Patent: Oct. 14, 2025

(54) ELECTRONIC DEVICE WITH AN EXTRACTION DEVICE AND EXTRACTION DEVICE THEREOF

(71) Applicant: Getac Technology Corporation, New Taipei (TW)

(72) Inventor: Kun-Cheng Lee, Taipei (TW)

(73) Assignee: Getac Technology Corporation, New Taipei (TW)

( * ) Notice: Subject to any disclaimer, the term of this patent is extended or adjusted under 35 U.S.C. 154(b) by 191 days.

(21) Appl. No.: 18/149,164

(22) Filed: Jan. 3, 2023

(65) Prior Publication Data

US 2023/0240034 A1 Jul. 27, 2023

Related U.S. Application Data

(60) Provisional application No. 63/302,986, filed on Jan. 25, 2022.

(30) Foreign Application Priority Data

Nov. 17, 2022 (CN) .......................... 202211441984.8

(51) Int. Cl.
*H05K 7/00* (2006.01)
*H05K 7/14* (2006.01)

(52) U.S. Cl.
CPC .................................. *H05K 7/1415* (2013.01)

(58) Field of Classification Search
CPC .................................................. H05K 7/1415
See application file for complete search history.

(56) References Cited

U.S. PATENT DOCUMENTS

| 5,309,325 A | 5/1994 | Dreher et al. |
| 10,261,554 B1 | 4/2019 | Lin |
| 10,340,635 B1 * | 7/2019 | Lee ..................... H01R 13/6335 |

(Continued)

FOREIGN PATENT DOCUMENTS

| CN | 208335081 U | 1/2019 |
| CN | 110691486 A | 1/2020 |
| CN | 113406996 A | 9/2021 |

(Continued)

OTHER PUBLICATIONS

Search Report issued on Jun. 22, 2023 for EP application No. 23150431.7.

*Primary Examiner* — Pete T Lee
(74) *Attorney, Agent, or Firm* — Cooper Legal Group, LLC

(57) ABSTRACT

An electronic device with an extraction device and an extraction device thereof are provided. The extraction device includes a housing and a handle. A front side of the housing has two ends. The two ends have a pivot and a limiting member, respectively. The limiting member has at least one limiting recessed portion that has a draw bar and a hook. Two ends of the draw bar have a long groove and a pulling and gripping portion, respectively. The pulling and gripping portion is connected to the hook, the pivot is disposed in the long groove, and the hook can engage in the at least one limiting recessed portion along a sliding direction to be in an engaged state. The handle in the engaged state can slide along an unlocking direction so to depart from the at least one limiting recessed portion to be in an unengaged state.

20 Claims, 9 Drawing Sheets

(56) References Cited

U.S. PATENT DOCUMENTS

2014/0375187 A1   12/2014   Li

FOREIGN PATENT DOCUMENTS

| CN | 112018560 B | 2/2022 |
| TW | M405588 U1 | 6/2011 |
| TW | 201927112 A | 7/2019 |
| TW | I670000 B | 8/2019 |

* cited by examiner

ELECTRONIC DEVICE WITH AN EXTRACTION DEVICE AND EXTRACTION DEVICE THEREOF

CROSS-REFERENCE TO RELATED PATENT APPLICATION

This application claims the benefit of priorities to the U.S. Provisional patent application Ser. No. 63/302,986 filed on Jan. 25, 2022, and China Patent Application No. 202211441984.8, filed on Nov. 17, 2022 in People's Republic of China which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device with an extraction device and an extraction device thereof, and more particularly to an extraction device, which is provided with a handle that can be locked to an electronic device or extracted away from the electronic device.

BACKGROUND OF THE DISCLOSURE

Existing electronic devices have peripheral accessories that are designed to be capable of being plugged or unplugged from the device, and are therefore referred to as extraction devices. These extraction devices can be plugged into the electronic devices for use, or can be extracted from the electronic devices for portability. When the extraction device is plugged in the electronic devices, the extraction device is usually submerged completely into the electronic devices.

In order to facilitate removal of the extraction device, a conventional extraction device is provided with a multi-piece handle for the user to hold on to for engaging or disengaging the conventional extraction device from the electronic device. Since the handle is a multi-piece design, the structure of the handle is more complex and occupies significant space, sometimes unnecessarily. In addition, such a complex structure may easily lead to malfunctions or inconveniences in operation.

SUMMARY OF THE DISCLOSURE

In response to the above-referenced technical inadequacies, the present disclosure provides an extraction device.

In one aspect, the present disclosure provides an extraction device. The extraction device includes a housing and a handle. A front side of the housing has two ends, one of the two ends has a pivot, and another one of the two ends has a limiting member. The limiting member has at least one limiting recessed portion that is formed along a sliding direction. The handle has a draw bar and a hook. The draw bar has a pivot end and an operation end, the pivot end of the draw bar has a long groove that is formed along a longitudinal direction of the draw bar, and a pulling and gripping portion is formed on the operation end of the draw bar. The pulling and gripping portion is connected to the hook, the pivot of the housing is disposed in the long groove of the draw bar, and the hook is configured to be engaged into the at least one limiting recessed portion along the sliding direction to be in an engaged state. The handle is configured to slide for a straight-line distance along an unlocking direction, so that the hook in the engaged state departs from the at least one limiting recessed portion to be in an unengaged state.

In response to the above-referenced technical inadequacies, the present disclosure provides an electronic device with an extraction device.

In one aspect, the present disclosure provides an electronic device with an extraction device. The electronic device includes a main body and an extraction device. The main body has a receiving groove and a notch. The extraction device is detachably disposed in the receiving groove and includes a housing and a handle. A front side of the housing has two ends, one of the two ends has a pivot, and another one of the two ends has a limiting member. The limiting member has at least one limiting recessed portion that is formed along a sliding direction. The handle has a draw bar and a hook. The draw bar has a pivot end and an operation end, the pivot end of the draw bar has a long groove that is formed along a longitudinal direction of the draw bar, and a pulling and gripping portion is formed on the operation end of the draw bar. The pulling and gripping portion is connected to the hook, the pivot of the housing is disposed in the long groove of the draw bar, and the hook is configured to be engaged into the at least one limiting recessed portion along the sliding direction to be in an engaged state and blocked at an inner edge of the notch. The handle is configured to slide for a straight-line distance along an unlocking direction, so that the hook in the engaged state departs from the at least one limiting recessed portion to be in an unengaged state.

Therefore, in the electronic device and the extraction device thereof provided by the present disclosure, by virtue of "the handle having a draw bar and a hook, a pulling and gripping portion being formed on the operation end of the draw bar, and the pulling and gripping portion being connected to the hook" and "the handle being configured to slide for a straight-line distance along an unlocking direction, so that the hook in the engaged state departs from the at least one limiting recessed portion to be in an unengaged state," the extraction device can provide a convenient and sturdy handle to increase the convenience of operation. The handle integrates the draw and the hook into a one-piece structure, and the handle also has the function of a latch. During the unlocking process, the hook departs from the housing and a casing of the electronic device along with the handle, so as to prevent the hook from being damaged by collision against the casing.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE DISCLOSURE

Figure 1:
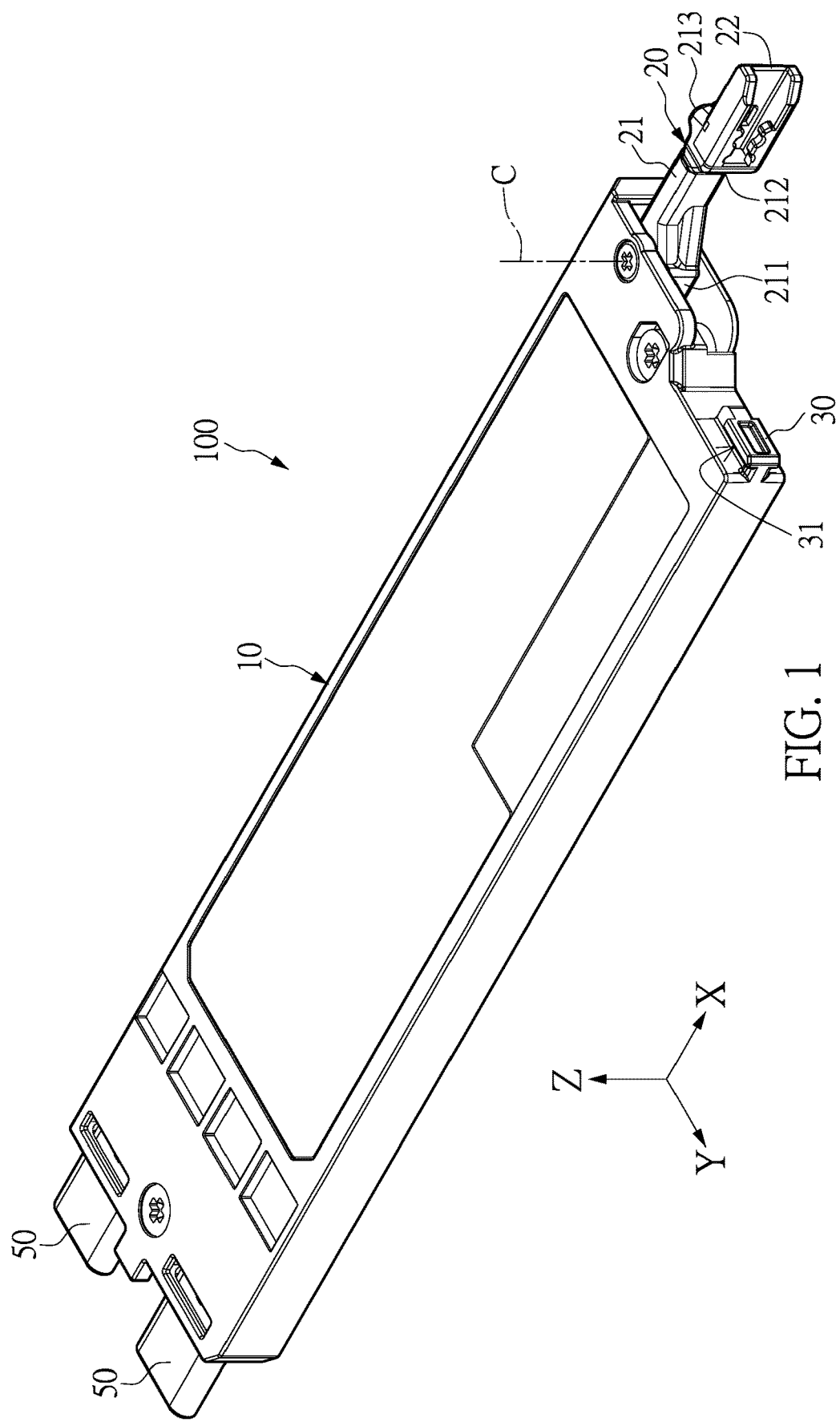
FIG. 1 is a schematic perspective view of an extraction device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 6:
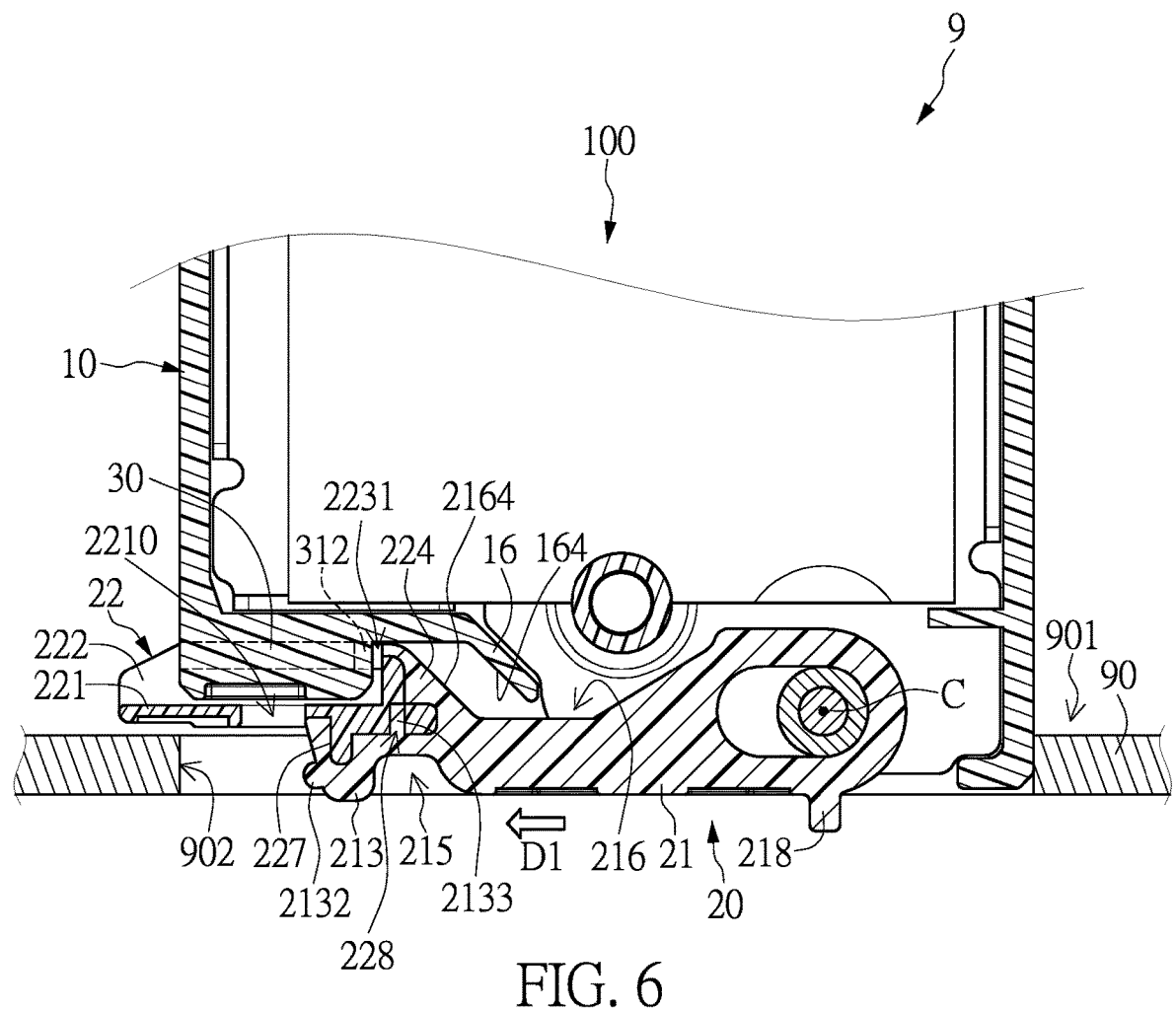
FIG. 6 is a schematic cross-sectional view of the extraction device in an engaged state and located in an electronic device according to the present disclosure.

Referring to FIG. 1 to FIG. 4, the present disclosure provides an electronic device with an extraction device. The electronic device 9 (as shown in FIG. 6) includes a main body 90, and the main body 90 has a receiving groove 901 and a notch 902. The extraction device 100 is detachably disposed in the receiving groove 901, and the notch 902 serves as an entrance and an exit of the receiving groove 901. For example, the electronic device 9 in the present embodiment can be, for example, a notebook computer, a tablet computer, or an industrial computer, but the present disclosure is not limited thereto.

Figure 8:
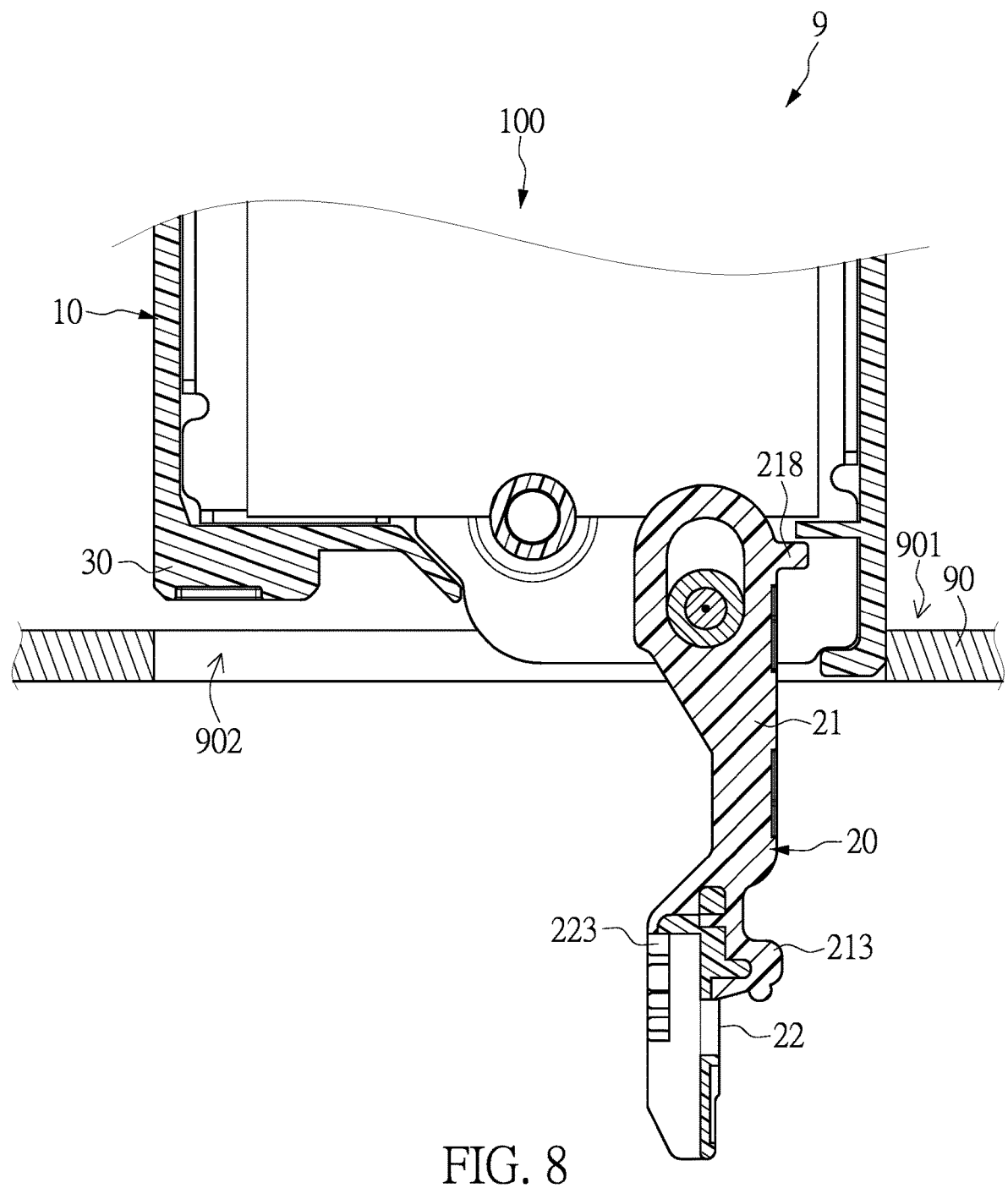
FIG. 8 is a schematic cross-sectional view of a handle of the extraction device rotated outward according to the present disclosure.
Figure 9:
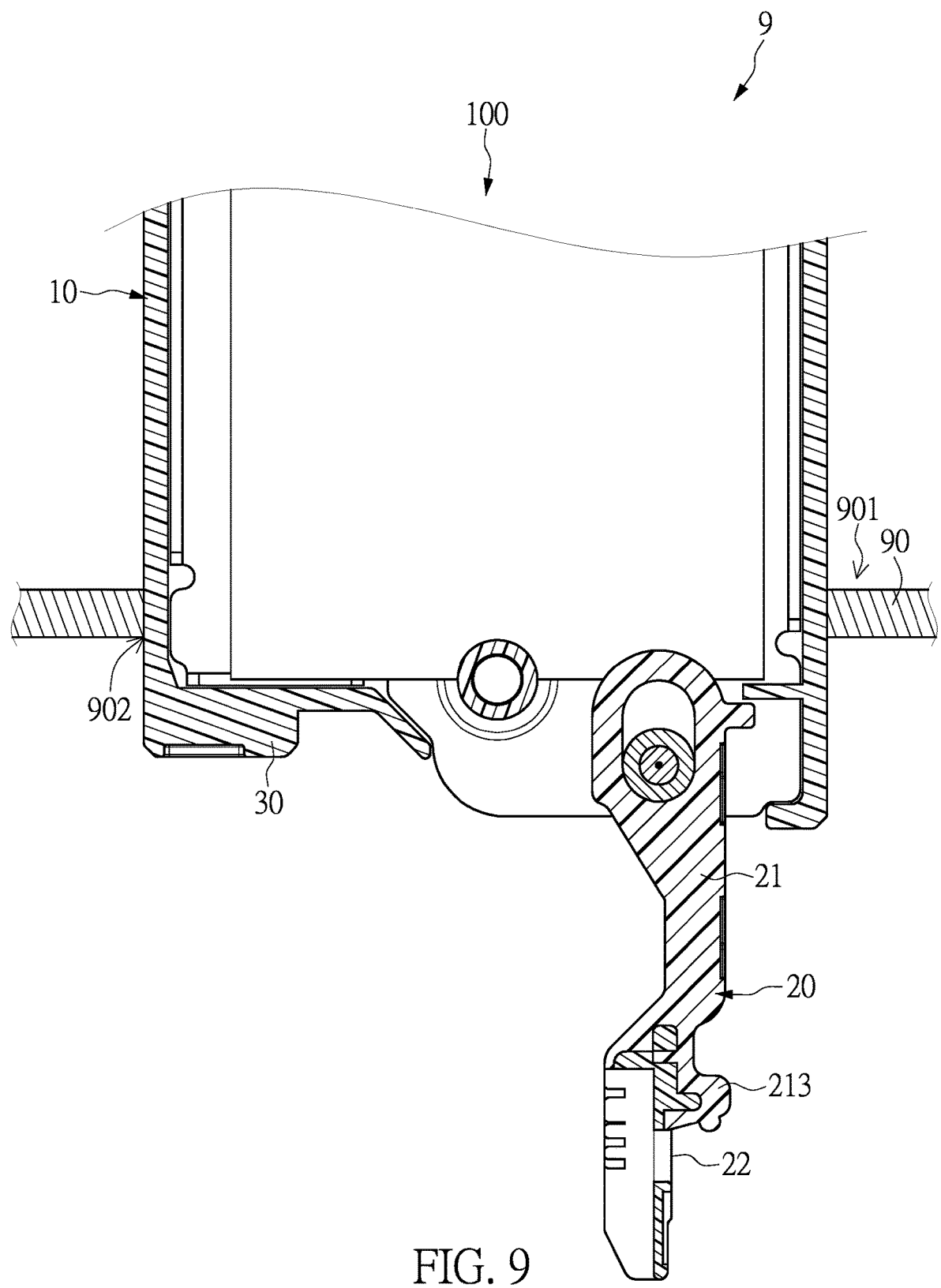
FIG. 9 is a schematic cross-sectional view of the extraction device extracted out from the electronic device according to the present disclosure.

The extraction device 100 is detachably disposed in the receiving groove 901 of the electronic device 9 (as shown in FIG. 8 and FIG. 9) along an extraction direction (e.g., an X-axis direction in FIG. 1). In the present embodiment, the extraction direction is a direction away from the electronic device 9, and is also a longitudinal direction of the electronic device 9.

Figure 2:
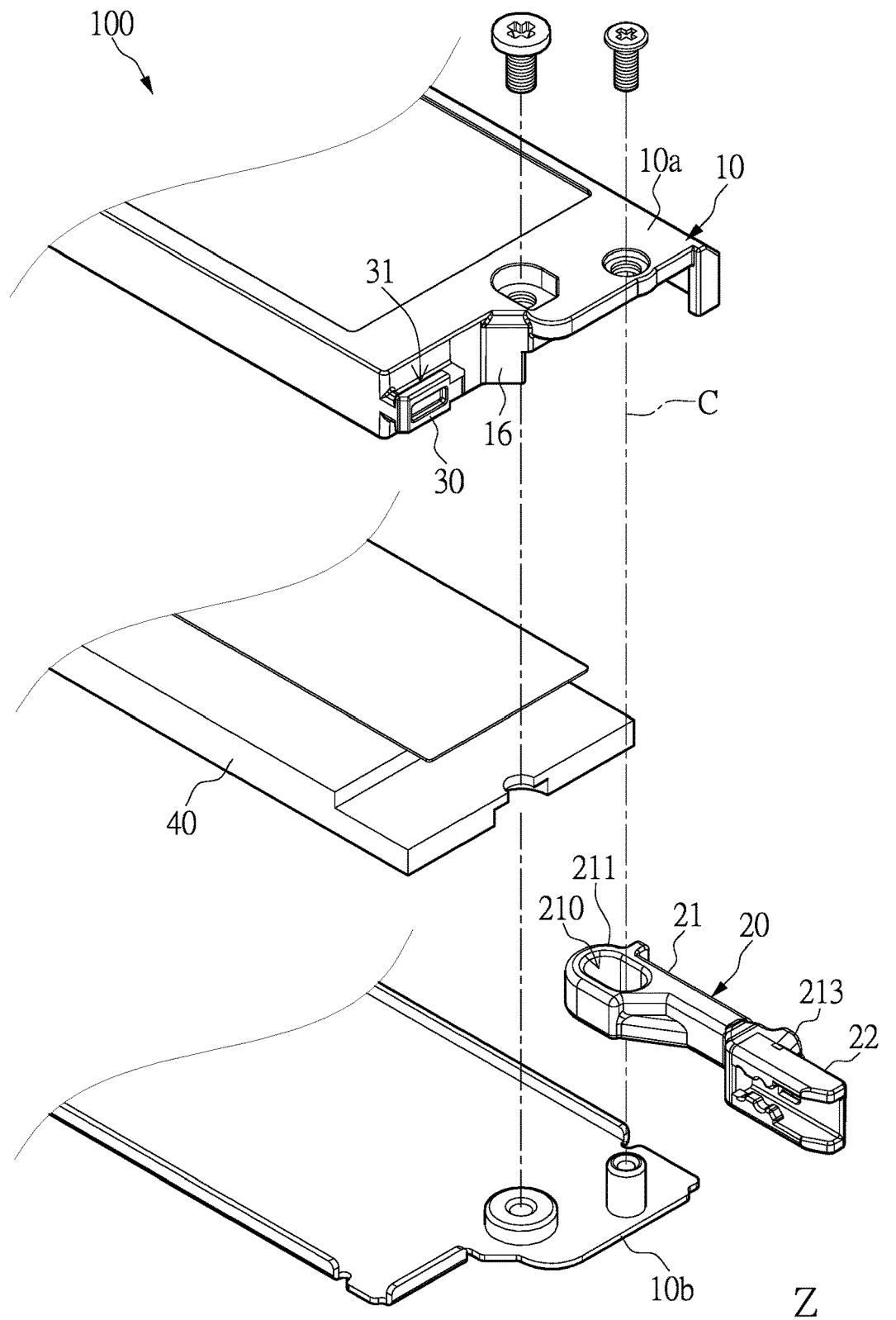
FIG. 2 is a partial exploded view of the extraction device according to the present disclosure.
Figure 3:
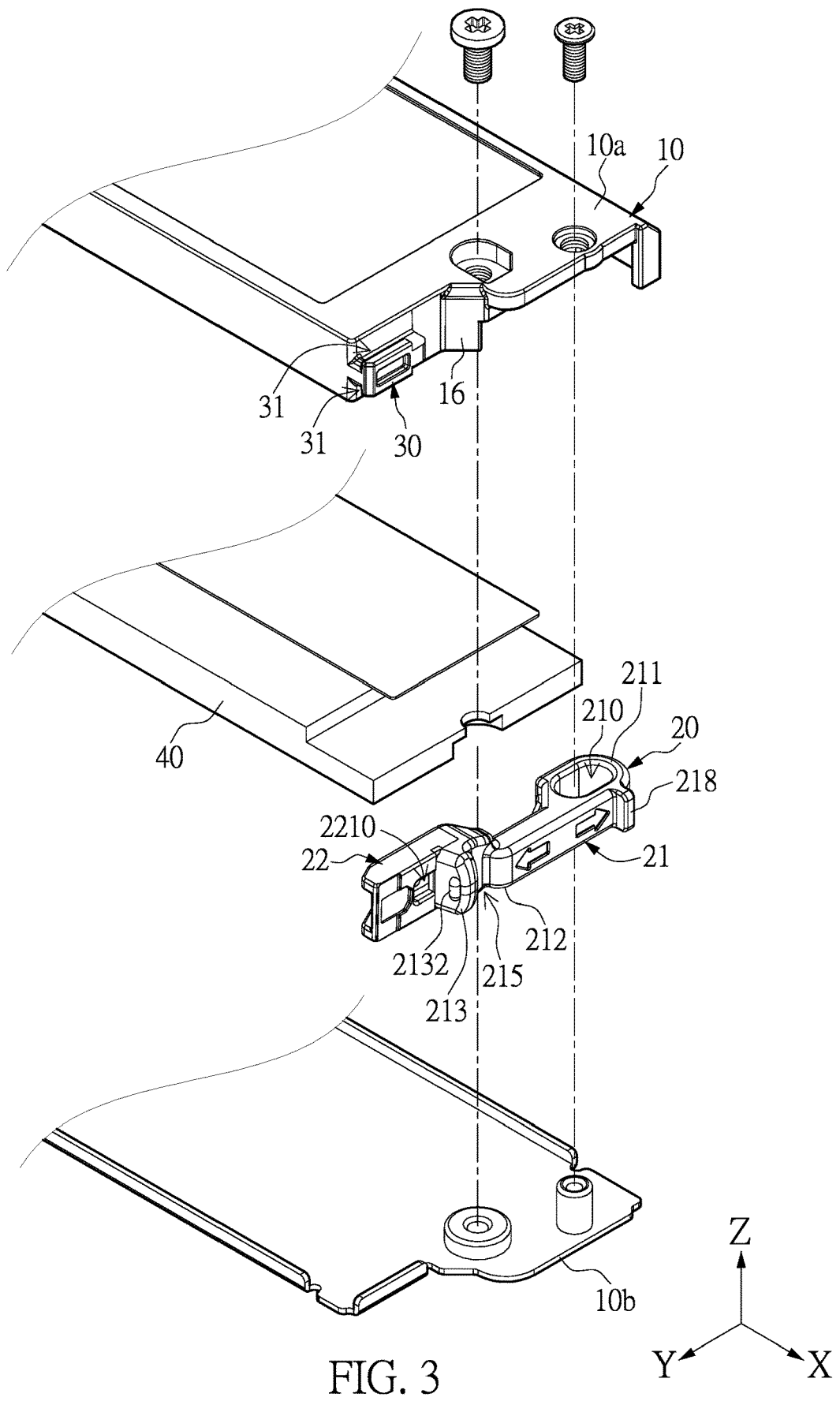
FIG. 3 is another partial exploded view of the extraction device according to the present disclosure.

Referring to FIG. 2 and FIG. 3, the extraction device 100 includes a housing 10 and a handle 20. A front side of the housing 10 has two ends, one of the two ends has a pivot C, and another one of the two ends has a limiting member 30. The housing 10 in the present embodiment is formed by connecting an upper casing 10a and a lower casing 10b to each other. The limiting member 30 has at least one limiting recessed portion 31 that is formed along a sliding direction (e.g., a Y-axis direction in FIG. 1, and a sliding direction D1 in FIG. 6). In the present embodiment, each of both sides of the limiting member 30 has a limiting recessed portion 31. In other words, the limiting recessed portion 31 is perpendicular to the extraction direction of the extraction device 100, so that the limiting member 30 can limit the movement of the handle 20 in the extraction direction.

For example, the extraction device 100 in the present embodiment may be a removable storage device. Referring to FIG. 1, a storage unit 40 is accommodated inside the housing 10, and the storage unit 40 is, for example, a memory or a hard disk, but the present disclosure is not limited thereto. A rear side of the extraction device 100 has two connectors 50 that are electrically connected to the electronic device 9 to transmit data or signals, but the present disclosure is not limited thereto.

Referring to FIG. 1 and FIG. 3, the handle 20 has a draw bar 21 and a hook 22. The draw bar 21 has a pivot end 211 and an operation end 212. The pivot end 211 of the draw bar 21 has a long groove 210 that is formed along a longitudinal direction of the draw bar 21. A pulling and gripping portion 213 is formed on the operation end 212 of the draw bar 21, and is connected to the hook 22. An operator can hold the pulling and gripping portion 213 to operate the handle 20, which makes it easier for the operator to apply force. The pivot C of the housing 10 is disposed in the long groove 210 of the draw bar 21, and the hook 22 is configured to be engaged into the limiting recessed portions 31 along the sliding direction (e.g., a Y-axis direction in FIG. 1, and a sliding direction D1 in FIG. 6) to be in an engaged state (as shown in FIG. 6). At the same time, the hook 22 is blocked at an inner edge of the notch 902 of the electronic device 9. Thereby, the extraction device 100 is blocked and fixed inside the receiving groove 901 of the electronic device 9.

In the present embodiment, a material of the hook 22 is different from that of the draw bar 21. The draw bar 21 is made of an elastic material, the hook 22 is made of a rigid material, and the hook 22 is integrally connected to the draw bar 21. For example, the draw bar 21 and the hook 22 can be manufactured by double-material injection molding to form a one-piece structure. The advantage of the above arrangement of materials is that the draw bar 21 has elasticity and can be operated more comfortably by the operator, and the elasticity of the draw bar 21 can prevent a breakage of a rotating shaft caused by improper operation. The hook 22 has rigidity and can be firmly engaged with the limiting member 30. The structural strength of the hook 22 is strong and can be used as a lock to be fixed in the notch 902 of the electronic device 9.

Referring to FIG. 3, in the present embodiment, in order for the operator to conveniently hold the handle 20, the draw bar 21 has a finger-accommodating groove 215 that is formed on one of two sides of the pulling and gripping portion 213, and the draw bar 21 has an anti-slip protrusion 2132 that is formed on another one of the two sides of the pulling and gripping portion 213. The finger-accommodating groove 215 can be used for one of the fingers to easily exert force on the draw bar 21, and the anti-slip protrusion 2132 further provides a non-slip function for another one of the fingers to exert more force on the handle 20, especially when the force is applied along an unlocking direction D2.

Referring to FIG. 6, the present embodiment can strengthen a bonding strength between the draw bar 21 and the hook 22. The hook 22 has an upper protruding portion 227 facing the pulling and gripping portion 213. The upper protruding portion 227 may be, for example, in a plate shape or a columnar shape. In the present embodiment, the pulling and gripping portion 213 can cover the upper protruding portion 227 through the double-material injection molding technology. A connecting hole 228 is formed on a rear end of the hook 22, and the connecting hole 228 is, for example, a cylindrical hole. Moreover, a bottom of the pulling and gripping portion 213 has a lower protruding portion that is formed toward the hook 22 through the double-material injection molding technology, so that the lower protruding portion 2133 extends into the connecting hole 228. Accordingly, an inside of the draw bar 21 and the hook 22 are engaged with each other, so that a bonding strength of the structure is stronger.

Figure 7:
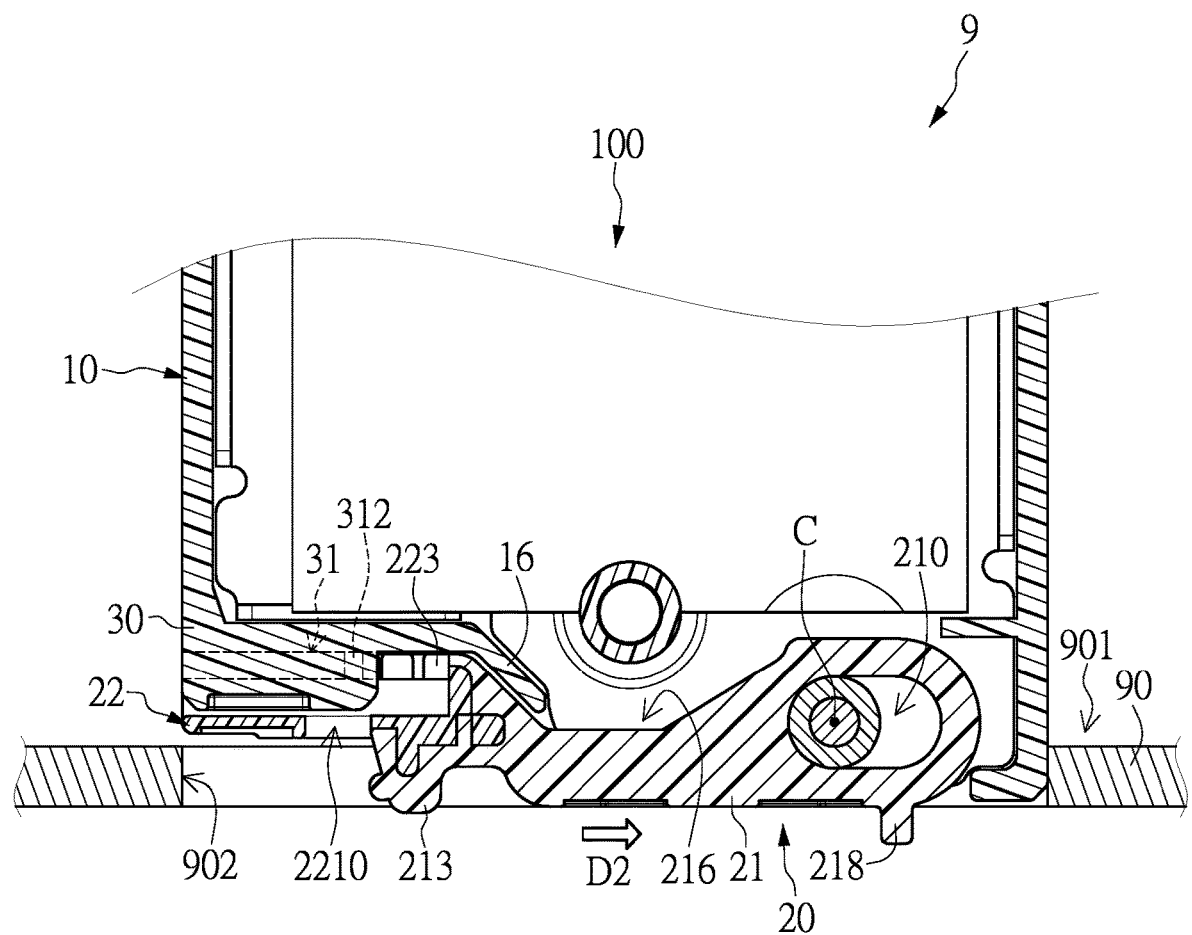
FIG. 7 is a schematic cross-sectional view of the extraction device in an unengaged state and located in the electronic device according to the present disclosure.

Referring to FIG. 7, the handle 20 can slide for a straight-line distance along an unlocking direction D2 (i.e., a negative Y-axis direction in FIG. 1 and FIG. 3) opposite to the sliding direction D1, so that the hook 22 in the engaged state departs from the limiting recessed portions 31 of the limiting member 30 to be in an unengaged state (as shown in FIG. 7). The straight-line distance can be determined by the length of the long groove 210. Then, the handle 20 can be turned over along the pivot C, and the hook 22 can be kept away from the front side of the housing 10.

Figure 4:
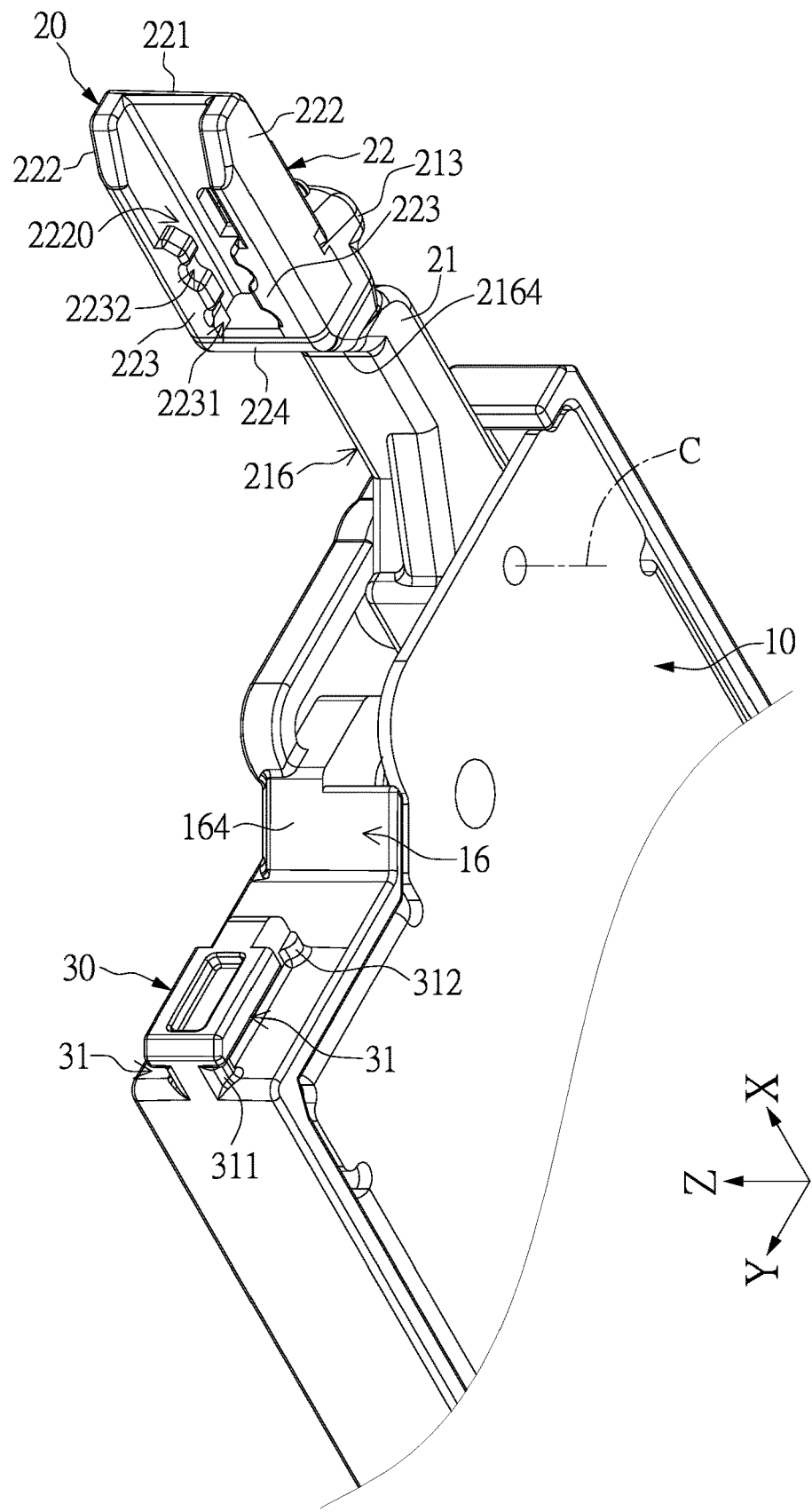
FIG. 4 is a partial enlarged view of the extraction device according to the present disclosure.
Figure 5:
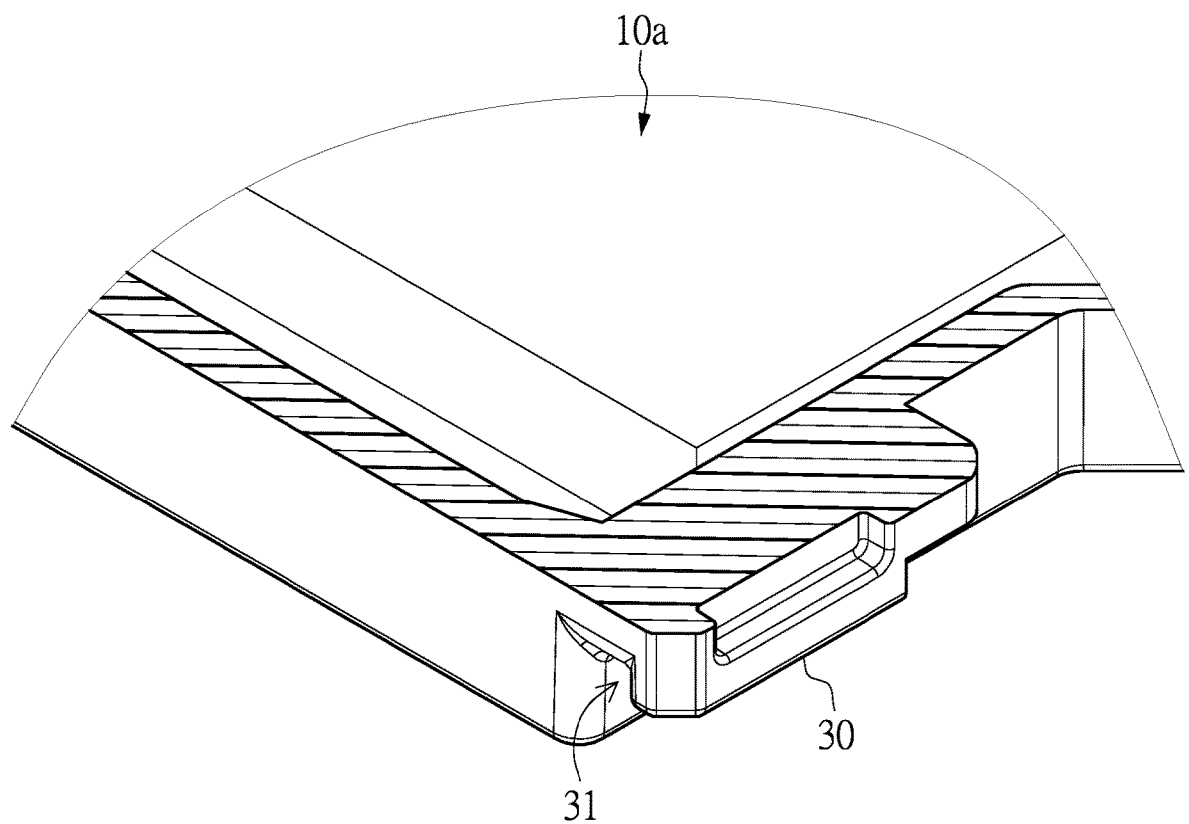
FIG. 5 is a partial enlarged view of a limiting member of the extraction device according to the present disclosure.

Referring to FIG. 4, the draw bar 21 further has a positioning groove 216 that is formed between the long groove 210 and the pulling and gripping portion 213 of the draw bar 21. The housing 10 can correspondingly have a block part 16, and the block part 16 can block movement of the draw bar 21, so that the draw bar 21 is in the unengaged state (as shown in FIG. 7, otherwise referred to as an unlocked state). Accordingly, when the operator feels that the handle 20 is blocked by the block part 16, the operator can know that the handle 20 has left the limiting member 30.

Referring to FIG. 4, FIG. 6, and FIG. 7, the block part 16 has a blocking bevel 164, the positioning groove 216 has a positioning bevel 2164, and the positioning bevel 2164 is close to the hook 22. When the hook 22 changes from the engaged state to the unengaged state, the blocking bevel 164 abuts against the positioning bevel 2164. In other words, when the handle 20 slides along the unlocking direction D2 until the positioning bevel 2164 abuts against the block part 16, the hook 22 of the handle 20 is in the unlocked state.

Referring to FIG. 4, the following description describes further details of the hook 22. The hook 22 has a top wall 221, a pair of side walls 222, and a rear wall 224. The pair of side walls 222 is connected to two sides of the top wall 221. The rear wall 224 is connected to the rear end of the pair of side walls 222 and is close to the draw bar 21. Each of bottoms of the pair of side walls 222 has an inner rail 223 that extends inward, and each of inner sides of the pair of side walls 222 is recessed to form a guide groove 2220. Specifically, the guide groove 2220 is located between the inner rail 223 and the top wall 221. Moreover, each of both sides of the limiting member 30 of the housing 10 has a limiting recessed portion 31, and the inner rail 223 can be slidably disposed in the limiting recessed portion 31. When the hook 22 is in the engaged state, the rear wall 224 abuts against the limiting member 30. When the inner rail 223 slides into the limiting recessed portion 31 of the limiting member 30, the handle 20 can be prevented from being displaced outwardly in the extraction direction. That is, the handle 20 is prevented from moving in the X-axis direction of FIG. 1 and FIG. 4.

In addition, as shown in FIG. 3, an observation window 2210 is formed on the top wall 221 of the hook 22, and a top portion of the limiting member 30 is exposed from the observation window 2210. In other words, different positions of the limiting member 30 can be seen through the observation window 2210. Accordingly, the operator can easily observe whether the handle 20 is in the engaged state, or has completely reached the unengaged state.

Referring to FIG. 4, the limiting recessed portion 31 further has a front blocking convex portion 311 and a rear blocking convex portion 312, the front blocking convex portion 311 is close to one of two ends of the limiting recessed portion 31, and the rear blocking convex portion 312 is close to another one of the two ends of the limiting recessed portion 31. Moreover, the inner rail 223 has a first positioning recessed hole 2231 and a second positioning recessed hole 2232, and the second positioning recessed hole 2232 is located in front of the first positioning recessed hole 2231. That is to say, the second positioning recessed hole 2232 is close to a free end of the hook 22.

Referring to FIG. 6, when the hook 22 is in the engaged state, the rear blocking convex portion 312 of the limiting member 30 is engaged into the first positioning recessed hole 2231 of the hook 22, so as to prevent the handle 20 from sliding. When the operator unlocks the hook 22, a tactile feedback can be provided by cooperation between the second positioning recessed hole 2232 and the rear blocking convex portion 312.

Referring to FIG. 7, when the hook 22 is in the unengaged state, the inner rail 223 of the hook 22 is completely separated from the limiting recessed portion 31 backwards. That is to say, the hook 22 is separated from the rear blocking convex portion 312 and is no longer restricted from moving, and the handle 20 can be freely turned outwards.

Referring to FIG. 7 and FIG. 8, the draw bar 21 has a rotation positioning block 218, and the rotation positioning block 218 protrudes outward from a top surface of the pivot end 211 (as shown in FIG. 1). When the operator continues to push the rotation positioning block 218 backward along the unlocking direction D2, the draw bar 21 can be turned over a predetermined angle (e.g., the predetermined angle in the present embodiment is 90°) along the pivot C, so that the hook 22 is away from the front side of the housing 10 and the operator can pull the handle 20 (or the draw bar 21) to extract the extraction device 100 from the electronic device 9. It is worth noting that the rotation positioning block 218 has another auxiliary function, and the another auxiliary function is that the rotation positioning block 218 can be blocked on the housing 10 when the draw bar 21 rotates along the pivot C by the predetermined angle, so as to prevent the draw bar 21 from being over-rotated (as shown in FIG. 8).

Referring to FIG. 9, the longitudinal direction of the handle 20 is parallel to the extraction direction, which is convenient for the operator to pull out the extraction device 100 from the notch 902 of the electronic device 9, allowing the extraction device 100 to depart from the receiving groove 901 of the main body 90. At this time, the hook 22 in the present embodiment is located at the front end of the handle 20 and has completely left the limiting member 30, such that the hook 22 will not be accidentally hit by the notch 902 of the electronic device 9.

Beneficial Effects of the Embodiment

In conclusion, in the electronic device and the extraction device thereof provided by the present disclosure, by virtue of "the handle having a draw bar and a hook, a pulling and gripping portion being formed on the operation end of the draw bar, and the pulling and gripping portion being connected to the hook" and "the handle being configured to slide for a straight-line distance along an unlocking direction, so that the hook in the engaged state departs from the at least one limiting recessed portion to be in an unengaged state," the extraction device can provide a convenient and sturdy handle to increase the convenience of operation. The handle integrates the draw and the hook into a one-piece structure, and the handle also has the function of a latch. During the unlocking process, the hook departs from the housing and a casing of the electronic device along with the handle, so as to prevent the hook from being damaged by collision against the casing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An extraction device, comprising:
   a housing having a front side that has two ends, one of the two ends including a pivot, and another one of the two ends including a limiting member, wherein the limiting member has at least one limiting recessed portion that is formed along a sliding direction, and the limiting member is directly attached to and extends from the housing;
   a handle having a draw bar and a hook, the draw bar having a pivot end and an operation end, the pivot end of the draw bar having a long groove that is formed along a longitudinal direction of the draw bar, and a pulling and gripping portion being formed on the operation end of the draw bar, wherein the pulling and gripping portion is connected to the hook, the pivot of the housing is disposed in the long groove of the draw bar, and the hook is configured to be engaged into the at least one limiting recessed portion along the sliding direction to be in an engaged state;
   wherein the handle is configured to slide for a straight-line distance along an unlocking direction, so that the hook in the engaged state departs from the at least one limiting recessed portion to be in an unengaged state.

2. The extraction device according to claim 1, wherein the draw bar is made of an elastic material, a material of the hook is different from that of the draw bar, and the hook is integrally connected to the draw bar.

3. The extraction device according to claim 1, wherein the hook has an upper protruding portion facing the pulling and gripping portion, the pulling and gripping portion covers the upper protruding portion, a connecting hole is formed on a rear end of the hook, a bottom of the pulling and gripping portion has a lower protruding portion that extends toward the hook, and the lower protruding portion extends into the connecting hole.

4. The extraction device according to claim 1, wherein the draw bar has a finger-accommodating groove that is formed on one of two sides of the pulling and gripping portion, and the draw bar has an anti-slip protrusion that is formed on another one of the two sides of the pulling and gripping portion.

5. The extraction device according to claim 1, wherein the draw bar has a positioning groove that is formed between the long groove and the pulling and gripping portion of the draw bar, the housing has a block part, and the block part is configured to block the draw bar, so that the draw bar is in the engaged state or the unengaged state.

6. The extraction device according to claim 5, wherein the block part has a blocking bevel, the positioning groove has a positioning bevel, the positioning bevel is close to the hook, and, when the hook changes from the engaged state to the unengaged state, the blocking bevel abuts against the positioning bevel.

7. The extraction device according to claim 1, wherein the hook has a top wall, a pair of side walls, and a rear wall, each of bottoms of the pair of side walls has an inner rail that extends inward, each of inner sides of the pair of side walls is recessed to form a guide groove that is located between the inner rail and the top wall, each of both sides of the limiting member of the housing has one of the at least one limiting recessed portion such that there are two limiting recessed portions, the inner rail is configured to be slidably disposed in a corresponding one of the two limiting recessed portions, and, when the hook is in the engaged state, the rear wall abuts against the limiting member.

8. The extraction device according to claim 7, wherein an observation window is formed on the top wall of the hook, and a top portion of the limiting member is exposed from the observation window.

9. The extraction device according to claim 7, wherein each of the two limiting recessed portions has a front blocking convex portion and a rear blocking convex portion, the front blocking convex portion is close to one of two ends of the corresponding one of the two limiting recessed portions, the rear blocking convex portion is close to another one of the two ends of the corresponding one of the two limiting recessed portions, the inner rail has a first positioning recessed hole and a second positioning recessed hole, the second positioning recessed hole is located in front of the first positioning recessed hole, and when the hook is in the engaged state, the rear blocking convex portion is engaged into the first positioning recessed hole of the hook.

10. The extraction device according to claim 1, wherein the draw bar has a rotation positioning block, the rotation positioning block protrudes outward from a top surface of the pivot end, and, when the draw bar is turned over a predetermined angle along the pivot, the draw bar is blocked on the housing.

11. An electronic device with an extraction device, comprising:

a main body having a receiving groove and a notch; and
the extraction device detachably disposed in the receiving groove, and including:
  a housing having a front side that has two ends, one of the two ends including a pivot, and another one of the two ends including a limiting member, wherein the limiting member has at least one limiting recessed portion that is formed along a sliding direction, and the limiting member is directly attached to and extends from the housing;
  a handle having a draw bar and a hook, the draw bar having a pivot end and an operation end, the pivot end of the draw bar having a long groove that is formed along a longitudinal direction of the draw bar, and a pulling and gripping portion being formed on the operation end of the draw bar, wherein the pulling and gripping portion is connected to the hook, the pivot of the housing is disposed in the long groove of the draw bar, and the hook is configured to be engaged into the at least one limiting recessed portion along the sliding direction to be in an engaged state and blocked at an inner edge of the notch;
  wherein the handle is configured to slide for a straight-line distance along an unlocking direction, so that the hook in the engaged state departs from the at least one limiting recessed portion to be in an unengaged state.

12. The electronic device according to claim 11, wherein the draw bar is made of an elastic material, a material of the hook is different from that of the draw bar, and the hook is integrally connected to the draw bar.

13. The electronic device according to claim 12, wherein the hook has an upper protruding portion facing the pulling and gripping portion, the pulling and gripping portion covers the upper protruding portion, a connecting hole is formed on a rear end of the hook, a bottom of the pulling and gripping portion has a lower protruding portion that extends toward the hook, and the lower protruding portion extends into the connecting hole.

14. The electronic device according to claim 11, wherein the draw bar has a finger-accommodating groove that is formed on one of two sides of the pulling and gripping portion, and the draw bar has an anti-slip protrusion that is formed on another one of the two sides of the pulling and gripping portion.

15. The electronic device according to claim 11, wherein the draw bar has a positioning groove that is formed between the long groove of the draw bar and the pulling and gripping portion, the housing has a block part, and the block part is configured to block the draw bar, so that the draw bar is in the engaged state or the unengaged state.

16. The electronic device according to claim 15, wherein the block part has a blocking bevel, the positioning groove has a positioning bevel, and the positioning bevel is close to the hook, and, when the hook changes from the engaged state to the unengaged state, the blocking bevel abuts against the positioning bevel.

17. The electronic device according to claim 11, wherein the hook has a top wall and a pair of side walls, each of bottoms of the pair of side walls has an inner rail that extends inward, each of inner sides of the pair of side walls is recessed to form a guide groove that is located between the inner rail and the top wall, each of both sides of the limiting member of the housing has one of the at least one limiting recessed portion such that there are two limiting recessed portions, and the inner rail is configured to be slidably disposed in a corresponding one of the two limiting recessed portions.

18. The electronic device according to claim 17, wherein an observation window is formed on the top wall of the hook, and a top portion of the limiting member is exposed from the observation window.

19. The electronic device according to claim 17, wherein each of the two limiting recessed portions has a front blocking convex portion and a rear blocking convex portion, the front blocking convex portion is close to one of two ends of the corresponding one of the two limiting recessed portions, the rear blocking convex portion is close to another one of the two ends of the corresponding one of the two limiting recessed portions, and the inner rail has a first positioning recessed hole and a second positioning recessed hole.

20. The electronic device according to claim 11, wherein the draw bar has a rotation positioning block, the rotation positioning block protrudes outward from a top surface of the pivot end, and, when the draw bar is turned over a predetermined angle along the pivot, the draw bar is blocked on the housing.

* * * * *